Patented Mar. 18, 1941

2,235,629

UNITED STATES PATENT OFFICE 2,235,629

ANTIOXIDANT

Albert M. Clifford, Stow, Ohio, assignor to Wingfoot Corporation, Wilmington, Del., a corporation of Delaware No Drawing. Application January 11, 1935, Serial No. 1,363

1 Claim. (Cl. 260—808)

This invention relates to antioxidants for the preservation of rubber. It includes a new type of reaction product, the use of reaction products of this type in the preservation of rubber and rubber which is preserved therewith. The antioxidant is a complex mixture of various compounds obtained by treating a halogenated aryl compound and, more particularly, a chlor aryl compound with an amine. As the mixture of compounds produced in this way is, in itself, a rubber antioxidant, it has been found advantageous not to separate the reaction product into its various components but to use, as such, the mixture of compounds obtained by the reaction, although, preferably, the reaction product is first washed with water to remove undesired constituents, such as salts. These mixtures show less tendency to bloom on rubber articles than individual compounds and are also more readily dispersed in the rubber mix. However, the various purified compounds obtainable from the reaction products have antioxidant properties and may be employed individually in rubber.

The halogen aryl compounds employed in carrying out the reaction are additionally substituted, i. e., they may, for example, be substituted with another halogen group, with a hydroxyl group, an amino group or a substituted amino group, and may contain other substituents as well. As representative of the chlor aryl compounds which may be employed, the following are mentioned:

Di chloro naphthalenes
Chloro naphthols
Chloro phenols
Chloro cresols
p-Chloro aniline
Chloro dialkyl anilines
Chloro diphenyl amine
Chloro phenyl naphthyl amines
Di chloro diphenyl amine
Phenyl or tolyl chloro naphthyl amines
Chloro phenyl tolyl amines
Di chloro biphenylene oxide
Di chloro acenaphthene
Di chloro fluorene
p p′ Di chloro diphenyl ether
p-Chloro phenyl naphthyl ether
p-Chloro benzyl chloride
Di chloro methyl phenetole
Di chloro methyl anisole
Chlorinated ethylene glycol di tolyl ether Brominated compounds which may be used include bromo naphthols, dibromo naphthalenes, p-bromo aniline, etc. and iodine compounds include p-iodo phenol, iodoaniline and iodocresols.

The amines employed may be phenyl or naphthyl compounds and may be substituted with other groups in addition to the amino group. They include, for example, Aniline
Toluidines
Xylidine
Cumidine
p-Amino phenol
p-Amino m-cresol
Amino biphenyl
Butyl amine
Cyclohexyl amine
Naphthylamines
Amino-methyl naphthalenes
p-Phenetidine
p-Anisidine
Diamino diphenyl methane and homologues
Amino triphenyl methane
Benzidine The antioxidant is obtained by autoclaving the halogenated aryl compound, for example the chlor aryl compound and the amine. The reaction mixture, after washing, may be used without further purification as an antioxidant. The halogenated aryl compound and the amine may be used in widely varying proportions such, for example, as equal molar portions of each, or two mols of the halogenated aryl compound to 1 mol of the amine, or seven mols of the amine to 1 mol of the halogenated aryl compound. In case the halogen compound contains two halogen atoms, it is generally desirable to increase the proportion of amine to at least four mols, and preferably more. As many as seven mols of primary amine can be successfully used per halogen atom to be removed. Mixtures of different halogenated aryl compounds and different amines may be used if desired. Using only a single compound of each type, a variety of reaction products is obtained, and, if the reaction is carried out under such conditions as to cause liberation of ammonia by the formation of a secondary amine from two of the amine radicals, a still greater variety of products is present in the reaction mixture.

When the reaction is carried out under such conditions as to produce no appreciable reaction between two amine molecules with liberation of ammonia, reactions such as the following take place:

$$XR'Cl + RNH_2 \rightarrow XR'.NHR$$
$$2XR'Cl + RNH_2 \rightarrow R'N(XR')_2$$

where X may be a substituent, such as Cl, NH₂ or OH, etc., and the R' of the chlor aryl group and the R of the amine may be the same or different aryl nuclei. The group X may be such that it will react with either the chlor aryl compound or the amine or a reaction product thereof, further increasing the complexity of the products obtained.

When the reaction is carried out under such conditions that two amine molecules react to give a secondary amine and ammonia the products will further include compounds of the type R.NH.R and XR'.NH.R'X where R' indicates the nucleus of the halogen aryl compound and R is the nucleus of the amine. Furthermore, where X is a halogen or hydroxyl group, additional compounds such as the following may be obtained

R.NH.R'.NHR
R.NH.R'.NH₂
NH₂.R'.NH₂
NH₂.R'.NH.R'.NH₂
R.NH.R'X
R.NH.R'.NH.R'.NH.R

In addition to such compounds, small amounts of tertiary amines will be formed. The presence of a catalyst may facilitate the liberation of ammonia from amines and such catalyst may or may not be included, depending upon the compounds desired in the final reaction mixture.

It is found advantageous to remove from the reaction mixture certain products which affect the activity of accelerators employed in the vulcanization of rubber, such for example, as inorganic constituents and primary amino compounds, if the antioxidant is to be incorporated in the rubber mix before vulcanization. To do this the reaction product is advantageously purified by filtering and washing thoroughly with water or dilute acid (such as 5% HCl) to remove acid-soluble constituents. These operations remove inorganic material and unreacted primary amine. Another method of purification includes removing the excess of unreacted primary amine by steam distillation and then washing the residue with water, filtering and drying. Another alternative method of purification includes washing with water, filtering and then subjecting to steam distillation or fractional distillation so as to volatilize the excess primary amine from the secondary amines, etc. The composite secondary-tertiary amine composition thus obtained consists of high-boiling compounds, and has been found useful as an antioxidant.

The general method for obtaining the reaction product consists in heating the mixture of the halogen compound and the amine for a period of from one to twenty hours or more at such a temperature that the halogen is removed from the organic combination. Ammonia may be used as an aid in this reaction. One mol of the halogen compound is treated with at least two mols, and preferably more, up to seven, of the amine, for each halogen atom present in the molecule of the halogen compound. The amine used is preferably an aromatic amine although in certain cases primary aliphatic amines may be employed, such as butyl amine, amyl amine, hexyl amine, methyl cyclohexyl amine, hexahydro phenetidine, etc.

The length of time and temperature of the reaction vary according to specific cases. Usually it will be desirable to maintain the temperature at 230–350° C., although temperatures as low as 150° C. may, in some instances, be used. Catalysts such as copper sulphate, aluminum chloride, stannic chloride, etc. may likewise be used to good advantage and generally are to be recommended. If the halogen compound contains two halogen atoms it is generally desirable to increase the proportion of amine employed to at least 4 mols or more. As many as 7 mols of primary amine can be successfully used for each halogen atom to be removed.

A number of examples for the preparation of antioxidant materials are given herewith but it will be understood that the invention is not limited to the reaction mixtures so prepared.

*Example 1*

To a solution of 3.0 parts SnCl₄ in 450 parts by weight of aniline was added 165 parts of 1-chloro 2-naphthol and the mixture autoclaved 12 hours at 320° C. more or less. The resulting product was thoroughly washed, first with dilute HCl and then water and finally dilute NaOH and again with water. When distilled, a fraction boiling between 139° and 320° C. at 5 mm. pressure was collected. This fraction was used as an antioxidant and may contain, among others, such compounds as 2-hydroxy 1-phenyl naphthyl amine, 1-chlor 2-phenyl naphthyl amine, N-N' diphenyl naphthylene diamine and N-di (hydroxynaphthyl) N-phenyl amine.

*Example 2*

To 1 mol 1-chloro 2-naphthol was added 2.2 mols n-butyl amine and the mixture treated with a small quantity of CuSO₄ and autoclaved 8 hours at 150° C. The oily product was washed with dilute NaOH, then water, and finally distilled in vacuo. A 60% yield of a product boiling between 140° and 195° C. at 13 mm. was obtained. This was used as an antioxidant and may contain 2-hydroxy 1-butyl naphthylamine, N-N' dibutyl naphthylene diamine, 1-chlor 2-butyl naphthylamine and other compounds.

*Example 3*

In this example, the mono sodium derivative of an amine is caused to react with p-dichloro benzene. Under a reflux 400 parts by weight of aniline were heated (boiling) with 51 parts of metallic sodium in the presence of NiO (0.5 part) catalyst. At the completion of this reaction, when all the Na had disappeared, and, after cooling to 120° C., 150 parts of p-dichloro benzene was added carefully. A vigorous reaction ensued, resulting in the formation of NaCl. The reaction product was treated with dilute HCl and the residual crude secondary amine (solid) recovered from toluene by crystallization; M. P. 50–75° C. The residue, used as an antioxidant, is believed to contain, among other compounds, p-chlor diphenyl amine and diphenyl p-phenylene diamine and/or its derivatives.

*Example 4*

A mixture of 197 parts of dichloro naphthalene and 558 parts by weight of aniline (1:6 mols) and 7.6 parts of SnCl₄ were autoclaved for 12 hours at 320° C. The product was taken up in benzene and filtered. The benzene solution was subjected to distillation and the residual composite product boiling above 160° C. at 29 mm. was used as an antioxidant.

Example 5

Cresylic acid was chlorinated to mono chloro cresol (mixture). The mixed mono chloro cresols, 160 parts, and 520 parts by weight of aniline were autoclaved 9 hours at 340° C. The product was taken up in benzene, filtered, and the benzene solution distilled. That portion of the product boiling between 170° and 335° at 35 mm. pressure was used as an antioxidant.

Example 6

A mixture of 156.5 parts of p-chloro phenetol and 536 parts of mixed toluidines (1:5 mols) and 4 parts of SnCl₄ were autoclaved for 8.5 hours, at 330–340° C. The reaction product was taken up in benzol, filtered, and the benzene solution distilled. That portion of the product distilling in the range 170°–260° C. at 30–40 mm., was used as an antioxidant.

Example 7

A solution of 160 parts by weight of mono chloro cresol and 590 parts of mixed toluidines (molar ratio—1:5) and 4.0 parts of SnCl₄ were autoclaved 9 hours at 340° C. The product taken up in benzene was filtered and the benzene solution distilled. That portion of the product boiling over the range 170°–330° C. at 30 mm. was used as an antioxidant.

Example 8

A mixture of 173 parts of chloro dimethyl aniline and 600 parts of mixed toluidines and 4 parts of SnCl₄ were autoclaved for 13 hours at 340° C. The product was taken up with benzene, filtered and distilled. The distillate was collected in fractions and the third portion to come over, boiling between 180° and 345° C. at 40 mm., was used as an antioxidant.

Example 9

A mixture of 109.5 parts by weight of 2:4 (dichloro methyl) phenetol, 372 parts aniline and 5 parts of SnCl₄ were autoclaved 9 hours at 300° C. The reaction product was taken up in toluene, filtered and the filtrate subjected to distillation to remove solvent and low boiling constituents. The high boiling residue was washed with dilute HCl, followed by thorough washing with water, then drying. The product, a dark oil, yield 134.5 parts, was used as an antioxidant and may include 2-4-di(phenyl amino methyl) phenetol and 2-phenyl amino methyl 4-chlormethyl phenetol.

The reaction mixtures obtained by the processes described in the preceding examples were used as antioxidants in a rubber mix according to the following formula:

|  | Parts |
|---|---|
| Acetone extracted rubber | 100.0 |
| Zinc oxide | 5.0 |
| Sulphur | 3.0 |
| Stearic acid | 1.5 |
| Hexamethylene tetramine | 1.0 |
| Antioxidant | 1.0 |

Data on cured samples before ageing was taken and further data on samples aged for six days in an oxygen bomb at 50° C. and 150 pounds pressure was also taken. This data is recorded in the following table:

| Cure | Original | | | | Aged | | | | Per cent wt. inc. |
|---|---|---|---|---|---|---|---|---|---|
|  | Tens. | Elg. | 500% | 700% | Tens. | Elg. | 500% | 700% |  |
| ANILINE+1-CHLORO 2-NAPHTHOL | | | | | | | | | |
| 35/285 | 93 | 875 | 11 | 33 | 117 | 850 | 15 | 48 | .04 |
| 50 | 119 | 825 | 18 | 60 | 129 | 885 | 22 | 78 | .05 |
| 70 | 146 | 780 | 23 | 88 | 127 | 725 | 28 | 107 | .03 |
| BUTYL AMINE+1-CHLORO 2-NAPHTHOL | | | | | | | | | |
| 35/285 | 118 | 875 | 13 | 41 | 125 | 815 | 18 | 63 | .16 |
| 50 | 134 | 785 | 21 | 78 | 156 | 770 | 27 | 104 | .16 |
| 70 | 164 | 740 | 30 | 127 | 157 | 695 | 40 | ----- | .40 |
| NA-ANILIDE+DICHLORO BENZENE | | | | | | | | | |
| 35/285 | 98 | 845 | 15 | 42 | 113 | 825 | 16 | 55 | .02 |
| 50 | 134 | 820 | 20 | 67 | 128 | 775 | 23 | 83 | .03 |
| 70 | 155 | 775 | 27 | 100 | 154 | 740 | 31 | 122 | .02 |
| ANILINE+DICHLORO NAPHTHALENE | | | | | | | | | |
| 35/285 | 124 | 875 | 15 | 46 | 110 | 830 | 15 | 51 | .07 |
| 50 | 134 | 815 | 18 | 66 | 126 | 775 | 21 | 76 | .13 |
| 70 | 162 | 770 | 26 | 104 | 142 | 725 | 30 | 118 | .11 |
| ANILINE+CHLORO CRESOLS | | | | | | | | | |
| 35/285 | 92 | 875 | 12 | 34 | 100 | 835 | 14 | 45 | .05 |
| 50 | 102 | 805 | 16 | 53 | 105 | 765 | 19 | 69 | .99 |
| 70 | 130 | 775 | 21 | 82 | 116 | 730 | 26 | 96 | .27 |
| CHLORO PHENETOL+MIXED TOLUIDINES | | | | | | | | | |
| 35/285 | 90 | 860 | 12 | 34 | 74 | 815 | 13 | 38 | .27 |
| 50 | 100 | 840 | 14 | 44 | 80 | 790 | 15 | 47 | .41 |
| 70 | 126 | 790 | 20 | 71 | 93 | 750 | 20 | 70 | .62 |

| Cur | Original | | | | Aged | | | | Per cent wt. inc. |
|---|---|---|---|---|---|---|---|---|---|
| | Tens | Elg. | 500% | 700% | Ten. | Elg. | 500% | 700% | |
| CHLORO CRESOLS+MIXED TOLUIDINES | | | | | | | | | |
| 35/285 | 80 | 890 | 12 | 30 | 106 | 875 | 13 | 40 | -------- |
| 50 | 108 | 800 | 18 | 60 | 125 | 790 | 19 | 73 | .16 |
| 70 | 136 | 765 | 23 | 90 | 130 | 725 | 27 | 114 | .18 |
| CHLORO DIMETHYL ANILINE+MIXED TOLUIDINES | | | | | | | | | |
| 35/285 | 90 | 920 | 11 | 27 | 98 | 865 | 13 | 38 | .04 |
| 50 | 103 | 835 | 15 | 46 | 108 | 800 | 17 | 60 | .17 |
| 70 | 130 | 790 | 21 | 72 | 110 | 735 | 23 | 89 | .29 |
| ANILINE+2:4 DICHLORO METHYL PHENETOL | | | | | | | | | |
| 35/285 | 106 | 825 | 17 | 54 | 119 | 785 | 23 | 74 | .06 |
| 50 | 146 | 800 | 23 | 80 | 132 | 745 | 29 | 101 | .25 |
| 70 | 178 | 775 | 30 | 115 | 147 | 720 | 37 | 133 | .37 |

What I claim is:

The method of treating rubber which comprises incorporating therein a mixture obtainable by reacting 1-chloro 2-naphthol and aniline.

ALBERT M. CLIFFORD.